United States Patent
Rodriguez

(10) Patent No.: US 12,543,994 B2
(45) Date of Patent: Feb. 10, 2026

(54) INTRACARDIAC UNIPOLAR FAR FIELD CANCELATION USING MULTIPLE ELECTRODE CATHETHERS

(71) Applicant: Biosense Webster (Israel) Ltd., Yokneam (IL)

(72) Inventor: Haim Rodriguez, Tel Mond (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 518 days.

(21) Appl. No.: 18/072,793

(22) Filed: Dec. 1, 2022

(65) Prior Publication Data

US 2023/0181087 A1 Jun. 15, 2023

Related U.S. Application Data

(60) Provisional application No. 63/288,966, filed on Dec. 13, 2021.

(51) Int. Cl.
*A61B 5/367* (2021.01)
*A61B 5/287* (2021.01)
*A61B 5/339* (2021.01)

(52) U.S. Cl.
CPC .............. *A61B 5/367* (2021.01); *A61B 5/287* (2021.01); *A61B 5/339* (2021.01)

(58) Field of Classification Search
CPC .......... A61B 5/367; A61B 5/287; A61B 5/339
See application file for complete search history.

(56) References Cited

U.S. PATENT DOCUMENTS

| | | |
|---|---|---|
| 5,391,199 A | 2/1995 | Ben-Haim |
| 5,443,489 A | 8/1995 | Ben-Haim |
| 5,558,091 A | 9/1996 | Acker et al. |
| 6,172,499 B1 | 1/2001 | Ashe |
| 6,239,724 B1 | 5/2001 | Doron et al. |
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |
| 6,788,967 B2 | 9/2004 | Ben-Haim et al. |
| 6,892,091 B1 | 5/2005 | Ben-Haim et al. |
| 7,536,218 B2 | 5/2009 | Govari et al. |
| 7,756,576 B2 | 7/2010 | Levin |
| 7,848,787 B2 | 12/2010 | Osadchy |
| 7,869,865 B2 | 1/2011 | Govari et al. |
| 8,456,182 B2 | 6/2013 | Bar-tal et al. |

(Continued)

FOREIGN PATENT DOCUMENTS

| | | |
|---|---|---|
| WO | WO2014105704 A1 | 7/2014 |
| WO | WO2021084255 A1 | 5/2021 |

OTHER PUBLICATIONS

International Search Report for corresponding PCT/IB2022/062029 dated Mar. 29, 2023.

*Primary Examiner* — Catherine M Voorhees
(74) *Attorney, Agent, or Firm* — Volpe Koenig

(57) ABSTRACT

A method is implemented by a mapping engine executed by a processor. The method includes receiving electrical activity from electrodes of a catheter. The method includes performing a spatial electrode signal analysis of the electrical activity for each electrode of the catheter. The method includes scaling a common signal component of the electrical activity identified by the spatial electrode signal analysis to determine a residual signal.

20 Claims, 5 Drawing Sheets

(56) References Cited

U.S. PATENT DOCUMENTS

| | | | |
|---|---|---|---|
| 2014/0067279 A1* | 3/2014 | George | A61B 5/327 |
| | | | 702/19 |
| 2014/0187991 A1* | 7/2014 | Thakur | A61B 5/316 |
| | | | 600/509 |
| 2016/0175023 A1* | 6/2016 | Ben Zriham | A61B 5/352 |
| | | | 600/509 |
| 2018/0296111 A1* | 10/2018 | Deno | A61B 5/746 |
| 2020/0138319 A1 | 5/2020 | Spector | |
| 2021/0338137 A1* | 11/2021 | García Quintanilla | |
| | | | A61B 5/361 |

* cited by examiner

INTRACARDIAC UNIPOLAR FAR FIELD CANCELATION USING MULTIPLE ELECTRODE CATHETHERS

INCORPORATION BY REFERENCE

This application claims priority to U.S. Provisional Application No. 63/288,966, which was filed on Dec. 13, 2021, and is incorporated herein by reference in its entirety.

FIELD OF INVENTION

The systems and methods herein relate generally to signal processing.

BACKGROUND

Generally, conventional cardiac mapping is a computer processing operation that produces a three-dimensional map of a heart. Medical professionals can use the three-dimensional map to determine a precise source location of an arrhythmia or when performing a medical procedure, such as a cardiac ablation to treat atrial fibrillation (aFib).

By way of example, in the conventional cardiac mapping, the three-dimensional map of the heart is created when a medical professional (e.g., a physician) guides a catheter through blood vessels of a patient until the catheter is inside the heart. The catheter senses electrical activity, and the computer processing operation analyzes the electrical activity and generates the three-dimensional map of the heart.

A problem with the conventional cardiac mapping is that far field signals mask or interfere with local field signals within the electrical activity. Further, the computer processing operation of the conventional is not suited for addressing the far field signals. For example, the computer processing operation assumes that all far field signals are the same on all electrodes of the catheter. What is needed is a system and method for extracting and analyzing the electrical activity from the catheter while reducing or canceling interference from a far field.

SUMMARY

According to an exemplary embodiment, a method is provided. The method is implemented by a mapping engine executed by one or more processors. The method includes receiving electrical activity from a plurality of electrodes of a catheter. The method includes performing a spatial electrode signal analysis of the electrical activity for each electrode of the plurality of electrodes. The method includes scaling a common signal component of the electrical activity identified by the spatial electrode signal analysis to determine a residual signal. According to one or more embodiments, the exemplary method embodiment above can be implemented as an apparatus, a system, and/or a computer program product According to one or more embodiments, a system is provided. The system includes a memory storing software of a mapping engine. The system includes one or more processors. The one or more processors execute the software to cause the mapping engine to receive electrical activity from a plurality of electrodes of a catheter; perform a spatial electrode signal analysis of the electrical activity for each electrode of the plurality of electrodes; and scale a common signal component of the electrical activity identified by the spatial electrode signal analysis to determine a residual signal. According to one or more embodiments, the exemplary system embodiment above can be implemented as an apparatus, a method, and/or a computer program product.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

The systems and methods herein relate generally to signal processing. According to one or more embodiments, the systems and methods herein provide intracardiac unipolar far field reduction or cancelation using multiple electrode catheters. As an example, the systems and methods herein are described with respect to a mapping engine.

The mapping engine can be implemented as processor executable code or software that is necessarily rooted in process operations by, and in processing hardware of, medical device equipment. For ease of explanation, the mapping engine is described herein with respect to mapping a heart; however, any anatomical structure, body part, organ, or portion thereof can be a target for mapping by the mapping engine described herein. According to one or more embodiments, the mapping engine dispenses with the conventional cardiac mapping assumption that all far field signals are the same on all electrodes. In contrast to the conventional cardiac mapping, the mapping engine intelligently implements a new assumption that far field signals are similar but not exactly the same. In turn, the mapping engine weights electrodes in opposite proportion to distances to identify a common signal component across the electrodes. This common signal component is used by the mapping engine to precisely reduce or cancel far field interference. Reducing or canceling the far field interference by the mapping engine produces cleaner near field signals for improved cardiac mapping.

One or more advantages, technical effects, and/or benefits of the mapping engine can include filtering out the far field interference and estimating pure local activity (e.g., especially in very complex mapping cases) from unipolar signals that replace a need for bipolar signals that are known for their disadvantages, such as electrodes distance and direction distortions. Thus, by particularly utilizing and transforming unipolar signals, the mapping engine doubles a number of analyzed electrodes to gain or increase spatial behavior resolution. Additionally, in cases of late activation, the mapping engine can also remove persistent aFib near-far field signals to enhance aFib target detection.

Figure 1:
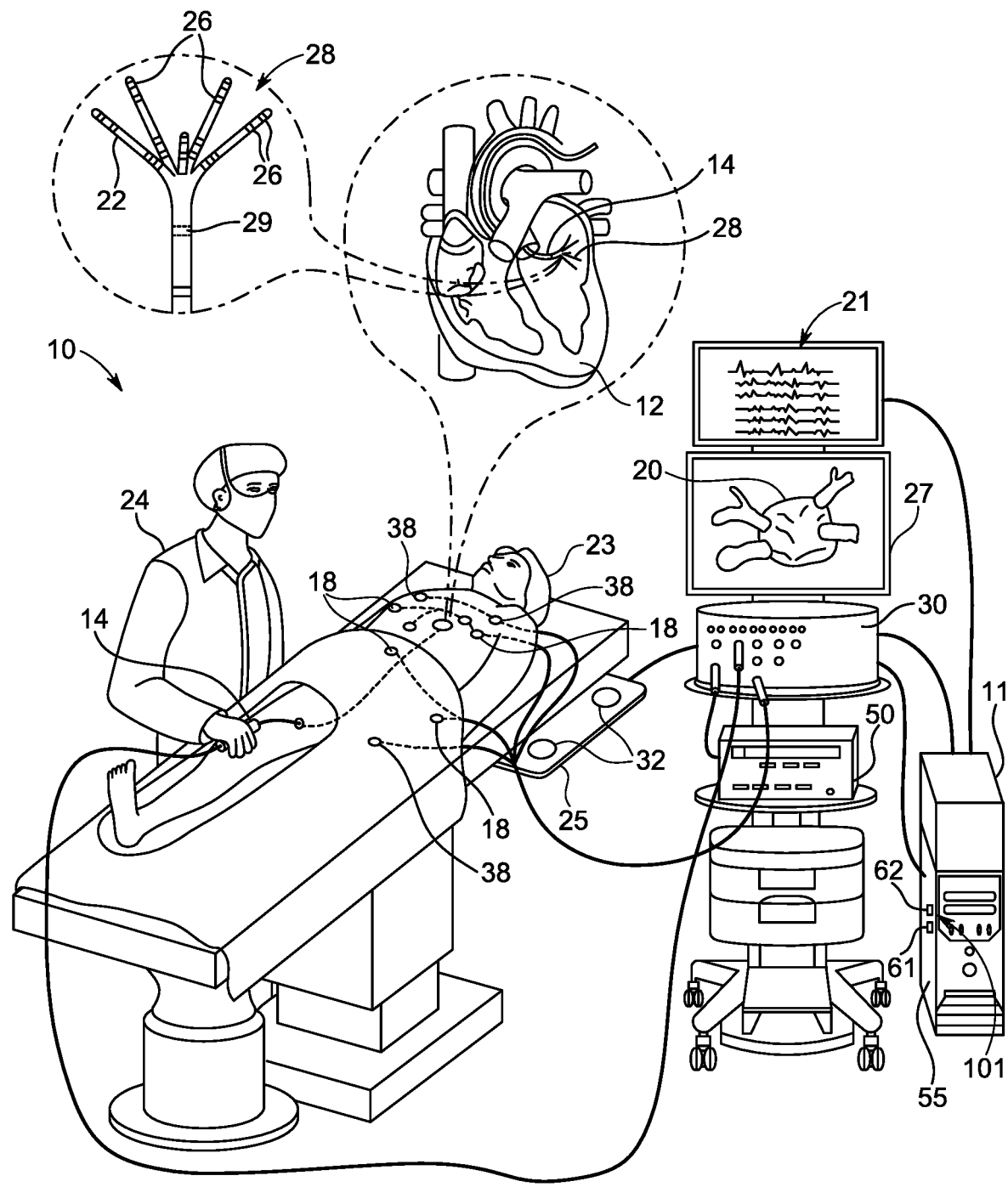
FIG. 1 illustrates a diagram of an example system in which one or more features of the disclosure subject matter can be implemented according to one or more embodiments.

FIG. 1 is a diagram of an example system (e.g., medical device equipment and/or catheter-based electrophysiology mapping and ablation), shown as a system 10, in which one or more features of the subject matter herein can be implemented according to one or more embodiments. All or part of the system 10 can be used to collect information (e.g., biometric data and/or a training dataset) and/or used to implement a mapping engine 101 as described herein. The system 10, as illustrated, includes a recorder 11, a heart 12, a catheter 14, a model or anatomical map 20, an electrogram 21, a spline 22, a patient 23, a physician 24 (or a medical professional or clinician), a location pad 25, an electrode 26, a display device 27, a distal tip 28, a sensor 29, a coil 32, a patient interface unit (PIU) 30, electrode skin patches 38, an ablation energy generator 50, and a workstation 55 (including at least one processor 61 and at least one memory 62, storing a mapping engine 101 therein). Note that each element and/or item of the system 10 is representative of one or more of that element and/or that item. The example of the system 10 shown in FIG. 1 can be modified to implement the embodiments disclosed herein. The disclosed embodiments can similarly be applied using other system components and settings. Additionally, the system 10 can include additional components, such as elements for sensing electrical activity and/or physiological signals, wired or wireless connectors, processing and display devices, or the like.

The system 10 includes multiple catheters 14, which are percutaneously inserted by the physician 24 through the patient's 23 vascular system into a chamber or vascular structure of the heart 12. Typically, a delivery sheath catheter (which is an example of the catheter 14) is inserted into the left or right atrium near a desired location in the heart 12. Thereafter, a plurality of catheters 14 can be inserted into the delivery sheath catheter so as to arrive at the desired location. The plurality of catheters 14 may include catheters dedicated for sensing Intracardiac Electrogram (IEGM) signals, catheters dedicated for ablating and/or catheters dedicated for both sensing and ablating. The example catheter 14 that is configured for sensing IEGM is illustrated herein. The physician 24 brings the distal tip 28 of the catheter 14 into contact with the heart wall for sensing a target site in the heart 12. For ablation, the physician 24 would similarly bring a distal end of an ablation catheter to a target site for ablating.

The catheter 14 is an exemplary catheter that includes one and preferably multiple electrodes 26 optionally distributed over a plurality of splines 22 at the distal tip 28 and configured to sense the IEGM signals. The catheter 14 may additionally include the sensor 29 embedded in or near the distal tip 28 for tracking position and orientation of the distal tip 28. Optionally and preferably, position sensor 29 is a magnetic based position sensor including three magnetic coils for sensing three-dimensional (3D) position and orientation.

The sensor 29 (e.g., a position or a magnetic based position sensor) may be operated together with the location pad 25 including a plurality of magnetic coils 32 configured to generate magnetic fields in a predefined working volume. Real time position of the distal tip 28 of the catheter 14 may be tracked based on magnetic fields generated with the location pad 25 and sensed by the sensor 29. Details of the magnetic based position sensing technology are described in U.S. Pat. Nos. 5,5391,199; 5,443,489; 5,558,091; 6,172,499; 6,239,724; 6,332,089; 6,484,118; 6,618,612; 6,690,963; 6,788,967; 6,892,091.

The system 10 includes one or more electrode patches 38 positioned for skin contact on the patient 23 to establish location reference for the location pad 25 as well as impedance-based tracking of the electrodes 26. For impedance-based tracking, electrical current is directed toward the electrodes 26 and sensed at the patches 38 (e.g., electrode skin patches) so that the location of each electrode can be triangulated via the patches 38. Details of the impedance-based location tracking technology are described in U.S. Pat. Nos. 7,536,218; 7,756,576; 7,848,787; 7,869,865; and 8,456,182, which are incorporated herein by reference.

The recorder 11 displays the electrograms 21 captured with the electrodes 18 (e.g., body surface electrocardiogram (ECG) electrodes) and IEGM captured with the electrodes 26 of the catheter 14. The recorder 11 may include pacing capability for pacing the heart rhythm and/or may be electrically connected to a standalone pacer.

The system 10 may include the ablation energy generator 50 that is adapted to conduct ablative energy to the one or more of electrodes 26 at the distal tip 28 of the catheter 14 configured for ablating. Energy produced by the ablation energy generator 50 may include, but is not limited to, radiofrequency (RF) energy or pulsed-field ablation (PFA) energy, including monopolar or bipolar high-voltage DC pulses as may be used to effect irreversible electroporation (IRE), or combinations thereof.

The PIU 30 is an interface configured to establish electrical communication between catheters, electrophysiological equipment, power supply and the workstation 55 for controlling operation of the system 10. Electrophysiological equipment of the system 10 may include for example, multiple catheters 14, the location pad 25, the body surface ECG electrodes 18, the electrode patches 38, the ablation energy generator 50, and the recorder 11. Optionally and preferably, the PIU 30 additionally includes processing capability for implementing real-time computations of location of the catheters and for performing ECG calculations.

The workstation 55 includes the memory 62, the processor unit 61 with the memory 62 or storage with appropriate operating software loaded therein, and user interface capability, as further described herein. The workstation 55 may provide multiple functions, optionally including (1) modeling the endocardial anatomy in three-dimensions (3D) and rendering the model or anatomical map 20 for display on the display device 27, (2) displaying on the display device 27 activation sequences (or other data) compiled from recorded electrograms 21 in representative visual indicia or imagery superimposed on the rendered anatomical map 20, (3) displaying real-time location and orientation of multiple catheters within the heart chamber, and (5) displaying on the display device 27 sites of interest such as places where ablation energy has been applied. One commercial product embodying elements of the system 10 is available as the CARTO® 3 System, available from Biosense Webster, Inc., 31A Technology Drive, Irvine, CA 92618.

The system 10 can be utilized to detect, diagnose, and/or treat cardiac conditions (e.g., using the mapping engine 101). Cardiac conditions, such as cardiac arrhythmias, persist as common and dangerous medical ailments, especially in the aging population. For instance, the system 10 can be part of a surgical system (e.g., CARTO® system sold by Biosense Webster) that is configured to obtain biometric data (e.g., anatomical and electrical measurements of a patient's organ, such as the heart 12 and as described herein) and perform a cardiac ablation procedure. More particularly, treatments for cardiac conditions such as cardiac arrhythmia often require obtaining a detailed mapping of cardiac tissue, chambers, veins, arteries and/or electrical pathways. For example, a prerequisite for performing a catheter ablation (as described herein) successfully is that the cause of the cardiac arrhythmia is accurately located in a chamber of the heart 12. Such locating may be done via an electrophysiological investigation during which electrical potentials are detected spatially resolved with a mapping catheter (e.g., the catheter 14) introduced into the chamber of the heart 12. This electrophysiological investigation, the so-called electro-anatomical mapping, thus provides 3D mapping data which can be displayed on the display device 27. In many cases, the mapping function and a treatment function (e.g., ablation) are provided by a single catheter or group of catheters such that the mapping catheter also operates as a treatment (e.g., ablation) catheter at the same time. According to one or more embodiments, the mapping engine 101 can be directly stored and executed by the catheter 14.

According to one or more embodiments, the mapping engine 101 performs an electrocardiograph and/or an intra-cardiac electrogram (ECG/ICEG). The ECG/ICEG are processes of decomposing/analyzing/recording electrical activity of the heart 12 over a period of time using the physiological signals of the plurality of electrodes 18 and 26 (e.g., with the ICEG, at least one of the electrodes 26 is inside the heart 12). That is, in support of the system 100 detecting, diagnosing, and/or treating cardiac conditions, the one or more catheters 14 can be navigated by the physician 24 into the heart 12 of the patient 23. In turn, the plurality of electrodes 18 and 26 detect and provide signals (a.k.a., physiological signals), which the mapping engine 101 uses to identify small electrical changes that arise from the heart muscle's electro-physiologic pattern of depolarizing during each heartbeat. The ECG/ICEG can be performed over a period of time, for example, such as ten (10) seconds. In this way, the overall magnitude and direction of the electrical depolarization at the heart 12 is captured at each moment throughout the cardiac cycle. The ECG/ICEG can be recorded during a diagnostic or therapeutic procedure. The procedure duration may vary from tens of minutes to several hours. During each therapeutic procedure, usually there are several dozens of ablation sessions, each of which last several seconds up to approximately 1 minute, for example.

According to one or more embodiments, the mapping engine 101 can include and execute one or more algorithms, such as algorithms that implement mathematical multi-signals decomposition operations). The mapping engine 101 reduces a need for wavefront algorithms, as the mapping engine 101 provides accurate near field components, activation time (e.g., using a minimum derivative), and voltage level (e.g., max-min). Examples of the one or more algorithms include, but are not limited to singular value decomposition (SVD), principal component analysis (PCA), and/or other matrix decompositions or factorizations.

In patients (e.g., the patient 23) with normal sinus rhythm (NSR), the heart (e.g., the heart 12), which includes atrial, ventricular, and excitatory conduction tissue, is electrically excited to beat in a synchronous, patterned fashion. Note that this electrical excitement can be detected as intracardiac electrocardiogram (IC ECG) data or the like.

According to one or more embodiments, in patients (e.g., the patient 23) with a cardiac arrhythmia (e.g., aFib), abnormal regions of cardiac tissue do not follow a synchronous beating cycle associated with normally conductive tissue, which is in contrast to patients with NSR. Instead, the abnormal regions of cardiac tissue aberrantly conduct to adjacent tissue, thereby disrupting the cardiac cycle into an asynchronous cardiac rhythm. Note that this asynchronous cardiac rhythm can also be detected as the IC ECG data. Such abnormal conduction has been previously known to occur at various regions of the heart 12, for example, in the region of the sino-atrial (SA) node, along the conduction pathways of the atrioventricular (AV) node, or in the cardiac muscle tissue forming the walls of the ventricular and atrial cardiac chambers. There are other conditions, such as flutter, where the pattern of abnormally conducting tissues lead to reentry paths such that the chamber beats in a regular pattern that can be multiple times the sinus rhythm.

By way of example, in support of the system 10 detecting, diagnosing, and/or treating cardiac conditions, the catheter 14 can be navigated by the physician 24 into the heart 12 of the patient 23 lying on the bed. For instance, the physician 24 can insert the shaft through the sheath, while manipulating a distal end of the shaft using the manipulator near the proximal end of the catheter 14 and/or deflection from the sheath. According to one or more embodiments, the catheter 14 can be fitted at the distal end of the shaft. The catheter 14 can be inserted through the sheath in a collapsed state and can be then expanded within the heart 12.

Generally, electrical activity at a point in the heart 12 may be typically measured by advancing the catheter 14 containing an electrical sensor (e.g., the sensor 29) at or near its distal tip (e.g., the at least one electrode 26) to that point in the heart 12, contacting the tissue with the sensor and acquiring data at that point. One drawback with mapping a cardiac chamber using a catheter of a type containing only a single, distal tip electrode is the long period of time required to accumulate data on a point-by-point basis over the requisite number of points required for a detailed map of the chamber as a whole. Accordingly, multiple-electrode catheters (e.g., the catheter 14) have been developed to simultaneously measure electrical activity at multiple points in the heart chamber.

The catheter 14, which can include the at least one electrode 26 and a catheter needle coupled onto a body thereof, can be configured to obtain biometric data, such as electrical signals of an intra-body organ (e.g., the heart 12), and/or to ablate tissue areas of thereof (e.g., a cardiac chamber of the heart 12). Note that the electrodes 26 are representative of any like elements, such as tracking coils, piezoelectric transducer, electrodes, or combination of elements configured to ablate the tissue areas or to obtain the biometric data. According to one or more embodiments, the catheter 14 can include one or more position sensors that used are to determine trajectory information. The trajectory information can be used to infer motion characteristics, such as the contractility of the tissue.

Biometric data (e.g., patient biometrics, patient data, or patient biometric data) can include one or more of local activation times (LATs), electrical activity, topology, bipolar mapping, reference activity, ventricle activity, dominant frequency, impedance, or the like. The LAT can be a point in time of a threshold activity corresponding to a local activation, calculated based on a normalized initial starting point. Electrical activity can be any applicable electrical signals that can be measured based on one or more thresholds and can be sensed and/or augmented based on signal to noise ratios and/or other filters. A topology can correspond to the physical structure of a body part or a portion of a body part and can correspond to changes in the physical structure relative to different parts of the body part or relative to different body parts. A dominant frequency can be a frequency or a range of frequency that is prevalent at a portion of a body part and can be different in different portions of the same body part. For example, the dominant frequency of a PV of a heart can be different than the dominant frequency of the right atrium of the same heart. Impedance can be the resistance measurement at a given area of a body part.

Examples of biometric data include, but are not limited to, patient identification data, IC ECG data, bipolar intracardiac reference signals, anatomical and electrical measurements, trajectory information, body surface (BS) ECG data, historical data, brain biometrics, blood pressure data, ultrasound signals, radio signals, audio signals, a two- or three-dimensional (3D) image data, blood glucose data, and temperature data, or other electrical activity and/or physiological signals. The biometrics data can be used, generally, to monitor, diagnosis, and treatment any number of various diseases, such as cardiovascular diseases (e.g., arrhythmias, cardiomyopathy, and coronary artery disease) and autoimmune diseases (e.g., type I and type II diabetes). Note that BS ECG data can include data and signals collected from electrodes on a surface of a patient, IC ECG data can include data and signals collected from electrodes within the patient, and ablation data can include data and signals collected from tissue that has been ablated. Further, BS ECG data, IC ECG data, and ablation data, along with catheter electrode position data, can be derived from one or more procedure recordings.

For example, the catheter 14 can use the electrodes 26 to implement intravascular ultrasound and/or MRI catheterization to image the heart 12 (e.g., obtain and process the biometric data). The catheter 14 is shown in an enlarged view, inside a cardiac chamber of the heart 12. It will be understood that any shape that includes one or more electrodes 26 can be used to implement the embodiments disclosed herein.

Examples of the catheter 14 include, but are not limited to, a linear catheter with multiple electrodes, a balloon catheter including electrodes dispersed on multiple spines that shape the balloon, a lasso, a catheter with electrodes in shape of a grid or loop catheter with multiple electrodes, a high density catheter, or any other applicable shape or complexity. Linear catheters can be fully or partially elastic such that it can twist, bend, and or otherwise change its shape based on received signal and/or based on application of an external force (e.g., cardiac tissue) on the linear catheter. The balloon catheter can be designed such that when deployed into a patient's body, its electrodes can be held in intimate contact against an endocardial surface. As an example, a balloon catheter can be inserted into a lumen, such as a pulmonary vein (PV). The balloon catheter can be inserted into the PV in a deflated state, such that the balloon catheter does not occupy its maximum volume while being inserted into the PV. The balloon catheter can expand while inside the PV, such that those electrodes on the balloon catheter are in contact with an entire circular section of the PV. Such contact with an entire circular section of the PV, or any other lumen, can enable efficient imaging and/or ablation. Other examples of the catheter 14 include PentaRay® catheter and Constellation catheter. Examples of the catheter 14 are also described with respect to FIGS. 5-6, as will be described in greater detail hereinafter.

According to other examples, body patches and/or body surface electrodes (e.g., the one or more electrode patches 38) may also be positioned on or proximate to a body of the patient 23. The catheter 14 with the one or more electrodes 26 can be positioned within the body (e.g., within the heart 12) and a position of the catheter 14 can be determined by the 100 system based on signals transmitted and received between the one or more electrodes 26 of the catheter 14 and the body patches and/or body surface electrodes. Additionally, the electrodes 26 can sense the biometric data from within the body of the patient 23, such as within the heart 12 (e.g., the electrodes 26 sense the electrical potential of the tissue in real time). The biometric data can be associated with the determined position of the catheter 14 such that a rendering of the patient's body part (e.g., the heart 12) can be displayed and show the biometric data overlaid on a shape of the body part.

By way of further example, the catheter 14 and other items of the system 10 can be connected to the workstation 55. The workstation 55 can include any computing device, which employs the ML/AI algorithm (which can be included within the mapping engine 101). According to an exemplary embodiment, the workstation 55 includes the one or more processors 61 (any computing hardware) and the memory 62 (any non-transitory tangible media), where the one or more processors 61 execute computer instructions with respect the mapping engine 101 and the memory 62 stores these instructions for execution by the one or more processors 61. For instance, the workstation 55 can be configured to receive and process the biometric data and determine if a given tissue area conducts electricity. In some embodiments, the workstation 55 can be further programmed by the mapping engine 101 (in software) to carry out the functions of an ablation procedure guidance method. For example, the ablation procedure guidance method can include receiving inputs (e.g., including one or more images and conduction velocity vector estimations), generating a digital twin of an anatomical structure utilizing the images and the conduction velocity vector estimations, and presenting the digital twin to provide precision ablation guidance of the anatomical structure and provide electrophysiology information of the anatomical structure.

According to one or more embodiments, the mapping engine 101 can be external to the workstation 55 and can be located, for example, in the catheter 14, in an external device, in a mobile device, in a cloud-based device, or can be a standalone processor. In this regard, the mapping engine 101 can be transferable/downloaded in electronic form, over a network.

In an example, the workstation 55 can be any computing device, as noted herein, including software (e.g., the mapping engine 101) and/or hardware (e.g., the processor 61 and the memory 62), such as a general-purpose computer, with suitable front end and interface circuits for transmitting and receiving signals to and from the catheter 14, as well as for controlling the other components of the system 10. For example, the front end and interface circuits include input/output (I/O) communication interfaces that enables the workstation 55 to receive signals from and/or transfer signals to the at least one electrode 26. The workstation 55 can include real-time noise reduction circuitry typically configured as a field programmable gate array (FPGA), followed by an analog-to-digital (ND) ECG or electrocardiograph/electromyogram (EMG) signal conversion integrated circuit. The workstation 55 can pass the signal from an ND ECG or EMG circuit to another processor and/or can be programmed to perform one or more functions disclosed herein.

The display device 27, which can be any electronic device for the visual presentation of the biometric data, is connected to the workstation 55. According to an exemplary embodiment, during a procedure, the workstation 55 can facilitate on the display device 27 a presentation of a body part rendering to the physician 24 and store data representing the body part rendering in the memory 62. For instance, maps depicting motion characteristics can be rendered/constructed based on the trajectory information sampled at a sufficient number of points in the heart 12. As an example, the display device 27 can include a touchscreen that can be configured to accept inputs from the physician 24, in addition to presenting the body part rendering.

In some embodiments, the physician 24 may manipulate the elements of the system 10 and/or the body part rendering using one or more input devices, such as a touch pad, a mouse, a keyboard, a gesture recognition apparatus, or the like. For example, an input device can be used to change a position of the catheter 14, such that rendering is updated. Note that the display device 27 can be located at a same location or a remote location, such as a separate hospital or in separate healthcare provider networks.

According to one or more embodiments, the system 10 can also obtain the biometric data using ultrasound, computed tomography (CT), MRI, or other medical imaging techniques utilizing the catheter 14 or other medical equipment. For instance, the system 10 can obtain ECG data and/or anatomical and electrical measurements of the heart 12 (e.g., the biometric data) using one or more catheters 14 or other sensors. More particularly, the workstation 55 can be connected, by a cable, to BS electrodes, which include adhesive skin patches affixed to the patient 23. The BS electrodes procure/generate the biometric data in the form of the BS ECG data. For instance, the processor 61 determines position coordinates of the catheter 14 inside the body part (e.g., the heart 12) of the patient 23. The position coordinates are based on impedances or electromagnetic fields measured between the body surface electrodes and the electrode 26 of the catheter 14 or other electromagnetic components. Additionally, or alternatively, location pads, which generate magnetic fields used for navigation, may be located on a surface of a bed (or a table). and may be separate from the bed. The biometric data can be transmitted to the workstation 55 and stored in the memory 62. Alternatively, or in addition, the biometric data is transmitted to a server, which may be local or remote, using a network as further described herein.

According to one or more embodiments, the catheter 14 may be configured to ablate tissue areas of a cardiac chamber of the heart 12. For instance, the catheter 14, in an enlarged view, inside a cardiac chamber of the heart 12. Further, ablation electrodes, such as the at least one electrode 26, are configured to provide energy to tissue areas of an intra-body organ (e.g., the heart 12). The energy may be thermal energy and may cause damage to the tissue area starting from the surface of the tissue area and extending into the thickness of the tissue area. The biometric data with respect to ablation procedures (e.g., ablation tissues, ablation locations, etc.) can be considered ablation data.

According to an example, with respect to obtaining the biometric data, a multi-electrode catheter (e.g., the catheter 14) is advanced into a chamber of the heart 12. Anteroposterior (AP) and lateral fluorograms can be obtained to establish the position and orientation of each of the electrodes. ECGs can be recorded from each of the electrodes 26 in contact with a cardiac surface relative to a temporal reference, such as the onset of the P-wave in sinus rhythm from a BS ECG and/or signals from electrodes 26 of the catheter 14 placed in the coronary sinus. The system, as further disclosed herein, may differentiate between those electrodes that register electrical activity and those that do not due to absence of close proximity to the endocardial wall. After initial ECGs are recorded, the catheter is typically repositioned, and fluorograms and ECGs may be recorded again. An electrical map (e.g., via cardiac mapping) can then be constructed from iterations of the process above.

Cardiac mapping can be implemented using one or more techniques. Generally, mapping of cardiac areas such as cardiac regions, tissue, veins, arteries and/or electrical pathways of the heart 12 may result in identifying problem areas such as scar tissue, arrhythmia sources (e.g., electric rotors), healthy areas, and the like. Cardiac areas are mapped such that a visual rendering of the mapped cardiac areas is provided using a display, as further disclosed herein. Additionally, cardiac mapping (which is an example of heart imaging) may include mapping based on one or more modalities such as, but not limited to LAT, local activation velocity, an electrical activity, a topology, a bipolar mapping, a dominant frequency, or an impedance. Data (e.g., biometric data) corresponding to multiple modalities may be captured using a catheter (e.g., the catheter 14) inserted into a patient's body and may be provided for rendering at the same time or at different times based on corresponding settings and/or preferences of the physician 24.

As an example of a first technique, cardiac mapping may be implemented by sensing an electrical property of heart tissue, for example, LAT, as a function of the precise location within the heart 12. The corresponding data (e.g., biometric data) may be acquired with one or more catheters (e.g., the catheter 14) that are advanced into the heart 12 and that have electrical and location sensors (e.g., the electrodes 26) in their distal tips. As specific examples, location and electrical activity may be initially measured on about 10 to about 20 points on the interior surface of the heart 12. These data points may be generally sufficient to generate a preliminary reconstruction or map of the cardiac surface to a satisfactory quality. The preliminary map may be combined with data taken at additional points to generate a more comprehensive map of the heart's electrical activity. In clinical settings, it is not uncommon to accumulate data at 100 or more sites (e.g., several thousand) to generate a detailed, comprehensive map of heart chamber electrical activity. The generated detailed map may then serve as the basis for deciding on a therapeutic course of action, for example, tissue ablation as described herein, to alter the propagation of the heart's electrical activity and to restore normal heart rhythm.

Further, cardiac mapping is generated based on detection of intracardiac electrical potential fields (e.g., which is an example of IC ECG data and/or bipolar intracardiac reference signals). A non-contact technique to simultaneously acquire a large amount of cardiac electrical information may be implemented. For example, a catheter type having a distal end portion may be provided with a series of sensor electrodes distributed over its surface and connected to insulated electrical conductors for connection to signal sensing and processing means. The size and shape of the end portion may be such that the electrodes are spaced substantially away from the wall of the cardiac chamber. Intracardiac potential fields may be detected during a single cardiac beat. According to an example, the sensor electrodes may be distributed on a series of circumferences lying in planes spaced from each other. These planes may be perpendicular to the major axis of the end portion of the catheter. At least two additional electrodes may be provided adjacent at the ends of the major axis of the end portion. As a more specific example, the catheter may include four circumferences with eight electrodes spaced equiangularly on each circumference. Accordingly, in this specific implementation, the catheter may include at least 34 electrodes (32 circumferential and 2 end electrodes). As another more specific example, the catheter may include other multi-spline catheters, such as five soft flexible branches, eight radial splines, or a parallel splined pancake turner type (e.g., any of which may have a total of 42 electrodes).

As example of electrical or cardiac mapping, an electrophysiological cardiac mapping system and technique based on a non-contact and non-expanded multi-electrode catheter (e.g., the catheter 14) can be implemented. ECGs may be obtained with one or more catheters 14 having multiple electrodes (e.g., such as between 42 to 122 electrodes). According to this implementation, knowledge of the relative geometry of the probe and the endocardium can be obtained by an independent imaging modality, such as transesophageal echocardiography. After the independent imaging, non-contact electrodes may be used to measure cardiac surface potentials and construct maps therefrom (e.g., in some cases using bipolar intracardiac reference signals). This technique can include the following steps (after the independent imaging step): (a) measuring electrical potentials with a plurality of electrodes disposed on a probe positioned in the heart 12; (b) determining the geometric relationship of the probe surface and the endocardial surface and/or other reference; (c) generating a matrix of coefficients representing the geometric relationship of the probe surface and the endocardial surface; and (d) determining endocardial potentials based on the electrode potentials and the matrix of coefficients.

As another example of electrical or cardiac mapping, a technique and apparatus for mapping the electrical potential distribution of a heart chamber can be implemented. An intra-cardiac multi-electrode mapping catheter assembly is inserted into the heart 12. The mapping catheter (e.g., the catheter 14) assembly preferably includes a multi-electrode array with one or more integral reference electrodes (e.g., one or the electrodes 26) or a companion reference catheter.

According to one or more embodiments, the electrodes may be deployed in the form of a substantially spherical array, which may be spatially referenced to a point on the endocardial surface by the reference electrode or by the reference catheter this is brought into contact with the endocardial surface. The preferred electrode array catheter may carry a number of individual electrode sites (e.g., at least 24). Additionally, this example technique may be implemented with knowledge of the location of each of the electrode sites on the array, as well as knowledge of the cardiac geometry. These locations are preferably determined by a technique of impedance plethysmography.

In view of electrical or cardiac mapping and according to another example, the catheter 14 is a heart mapping catheter assembly that includes an electrode array defining a number of electrode sites. The heart mapping catheter assembly also includes a lumen to accept a reference catheter having a distal tip electrode assembly used to probe the heart wall. The map heart mapping catheter assembly includes a braid of insulated wires (e.g., having 24 to 64 wires in the braid), and each of the wires may be used to form electrode sites. The heart mapping catheter assembly is readily positionable in the heart 12 to be used to acquire electrical activity information from a first set of non-contact electrode sites and/or a second set of in-contact electrode sites.

Further, according to another example, the catheter 14 that can implement mapping electrophysiological activity within the heart includes a distal tip that is adapted for delivery of a stimulating pulse for pacing the heart or an ablative electrode for ablating tissue in contact with the tip. This catheter 14 can further include at least one pair of orthogonal electrodes to generate a difference signal indicative of the local cardiac electrical activity adjacent the orthogonal electrodes.

As noted herein, the system 10 is utilized to detect, diagnose, and/or treat cardiac conditions. In example operation, a process for measuring electrophysiologic data in a heart chamber is implemented by the system 10. The process includes, in part, positioning a set of active and passive electrodes into the heart 12, supplying current to the active electrodes, thereby generating an electric field in the heart chamber, and measuring the electric field at the passive electrode sites. The passive electrodes are contained in an array positioned on an inflatable balloon of a balloon catheter. In preferred embodiments, the array is said to have from 60 to 64 electrodes.

As another example operation, cardiac mapping is implemented by the system 10 using one or more ultrasound transducers. The ultrasound transducers may be inserted into a patient's heart 12 and may collect a plurality of ultrasound slices (e.g., two dimensional or 3D slices) at various locations and orientations within the heart 12. The location and orientation of a given ultrasound transducer is known and the collected ultrasound slices are stored such that they can be displayed at a later time. One or more ultrasound slices corresponding to the position of the catheter 14 (e.g., a treatment catheter) at the later time are displayed and the catheter 14 is overlaid onto the one or more ultrasound slices.

In view of the system 10, it is noted that cardiac arrhythmias, including atrial arrhythmias, may be of a multiwavelet reentrant type, characterized by multiple asynchronous loops of electrical impulses that are scattered about the atrial chamber and are often self-propagating (e.g., another example of the IC ECG data). Alternatively, or in addition to the multiwavelet reentrant type, cardiac arrhythmias may also have a focal origin, such as when an isolated region of tissue in an atrium fires autonomously in a rapid, repetitive fashion (e.g., another example of the IC ECG data). Ventricular tachycardia (V-tach or VT) is a tachycardia, or fast heart rhythm that originates in one of the ventricles of the heart. This is a potentially life-threatening arrhythmia because it may lead to ventricular fibrillation and sudden death.

For example, aFib occurs when the normal electrical impulses (e.g., another example of the IC ECG data) generated by the sinoatrial node are overwhelmed by disorganized electrical impulses (e.g., signal interference) that originate in the atria veins and PVs causing irregular impulses to be conducted to the ventricles. An irregular heartbeat results, and may last from minutes to weeks, or even years. aFib is often a chronic condition that leads to a small increase in the risk of death often due to strokes. A line of treatment for aFib is medication that either slows the heart rate or reverts the heart rhythm back to normal. Additionally, persons with aFib are often given anticoagulants to protect them from the risk of stroke. The use of such anticoagulants comes with its own risk of internal bleeding. In some patients, medication is not sufficient and their aFib is deemed to be drug-refractory, i.e., untreatable with standard pharmacological interventions. Synchronized electrical cardioversion may also be used to convert aFib to a normal heart rhythm. Alternatively, aFib patients are treated by catheter ablation.

A catheter ablation-based treatment may include mapping the electrical properties of heart tissue, especially the endocardium and the heart volume, and selectively ablating cardiac tissue by application of energy. Electrical or cardiac mapping (e.g., implemented by any electrophysiological cardiac mapping system and technique described herein) includes creating a map of electrical potentials (e.g., a voltage map) of the wave propagation along the heart tissue or a map of arrival times (e.g., a LAT map) to various tissue located points. Electrical or cardiac mapping (e.g., a cardiac map) may be used for detecting local heart tissue dysfunction. Ablations, such as those based on cardiac mapping, can cease or modify the propagation of unwanted electrical signals from one portion of the heart 12 to another.

The ablation process damages the unwanted electrical pathways by formation of non-conducting lesions. Various energy delivery modalities have been disclosed for forming lesions, and include use of microwave, laser and more commonly, radiofrequency energies to create conduction blocks along the cardiac tissue wall. Another example of an energy delivery technique includes irreversible electroporation (IRE), which provides high electric fields that damage cell membranes. In a two-step procedure (e.g., mapping followed by ablation) electrical activity at points within the heart 12 is typically sensed and measured by advancing the catheter 14 containing one or more electrical sensors (e.g., electrodes 26) into the heart 12 and obtaining/acquiring data at a multiplicity of points (e.g., as biometric data generally, or as ECG data specifically). This ECG data is then utilized to select the endocardial target areas, at which ablation is to be performed.

Cardiac ablation and other cardiac electrophysiological procedures have become increasingly complex as clinicians treat challenging conditions such as atrial fibrillation and ventricular tachycardia. The treatment of complex arrhythmias can now rely on the use of 3D mapping systems to reconstruct the anatomy of the heart chamber of interest. In this regard, the mapping engine 101 employed by the system 10 herein manipulates and evaluates the biometric data generally, or the ECG data specifically, to produce improved tissue data that enables more accurate diagnosis, images, scans, and/or maps for treating an abnormal heartbeat or arrhythmia. For example, cardiologists rely upon software, such as the Complex Fractionated Atrial Electrograms (CFAE) module of the CARTO® 3 3D mapping system, produced by Biosense Webster, Inc. (Diamond Bar, Calif.), to generate and analyze ECG data. The mapping engine 101 of the system 10 enhances this software to generate and analyze the improved biometric data, which further provide multiple pieces of information regarding electrophysiological properties of the heart 12 (including the scar tissue) that represent cardiac substrates (anatomical and functional) of aFib.

Accordingly, the system 10 implements a 3D mapping system, such as CARTO® 3 3D mapping system, to localize the potential arrhythmogenic substrate of the cardiomyopathy in terms of abnormal ECG detection. The substrate linked to these cardiac conditions is related to the presence of fragmented and prolonged ECGs in the endocardial and/or epicardial layers of the ventricular chambers (right and left). For instance, areas of low or medium voltage may exhibit ECG fragmentation and prolonged activities. Further, during sinus rhythm, areas of low or medium voltage may corresponds to a critical isthmus identified during sustained and organized ventricular arrhythmias (e.g., applies to non-tolerated ventricular tachycardias, as well as in the atria). In general, abnormal tissue is characterized by low-voltage ECGs. However, initial clinical experience in endo-epicardial mapping indicates that areas of low-voltage are not always present as the sole arrhythmogenic mechanism in such patients. In fact, areas of low or medium voltage may exhibit ECG fragmentation and prolonged activities during sinus rhythm, which corresponds to the critical isthmus identified during sustained and organized ventricular arrhythmias, e.g., applies only to non-tolerated ventricular tachycardias. Moreover, in many cases, ECG fragmentation and prolonged activities are observed in the regions showing a normal or near-normal voltage amplitude (>1-1.5 mV). Although the latter areas may be evaluated according to the voltage amplitude, they cannot be considered as normal according to the intracardiac signal, thus representing a true arrhythmogenic substrate. The 3D mapping may be able to localize the arrhythmogenic substrate on the endocardial and/or epicardial layer of the right/left ventricle, which may vary in distribution according to the extension of the main disease.

As another example operation, cardiac mapping may be implemented by the system 10 using one or more multiple-electrode catheters (e.g., the catheter 14). Multiple-electrode catheters are used to stimulate and map electrical activity in the heart 12 and to ablate sites of aberrant electrical activity. In use, the multiple-electrode catheter is inserted into a major vein or artery, e.g., femoral vein, and then guided into the chamber of the heart 12 of concern. A typical ablation procedure involves the insertion of the catheter 14 having at least one electrode 26 at its distal end, into a heart chamber. A reference electrode is provided, taped to the skin of the patient or by means of a second catheter that is positioned in or near the heart or selected from one or the other electrodes 26 of the catheter 14. Radio frequency (RF) current is applied to a tip electrode 26 of the ablating catheter 14, and current flows through the media that surrounds it (e.g., blood and tissue) toward the reference electrode. The distribution of current depends on the amount of electrode surface in contact with the tissue as compared to blood, which has a higher conductivity than the tissue. Heating of the tissue occurs due to its electrical resistance. The tissue is heated sufficiently to cause cellular destruction in the cardiac tissue resulting in formation of a lesion within the cardiac tissue which is electrically non-conductive. During this process, heating of the tip electrode 26 also occurs as a result of conduction from the heated tissue to the electrode itself. If the electrode temperature becomes sufficiently high, possibly above 60 degrees Celsius, a thin transparent coating of dehydrated blood protein can form on the surface of the electrode 26. If the temperature continues to rise, this dehydrated layer can become progressively thicker resulting in blood coagulation on the electrode surface. Because dehydrated biological material has a higher electrical resistance than endocardial tissue, impedance to the flow of electrical energy into the tissue also increases. If the impedance increases sufficiently, an impedance rise occurs, and the catheter 14 must be removed from the body and the tip electrode 26 cleaned.

Figure 2:
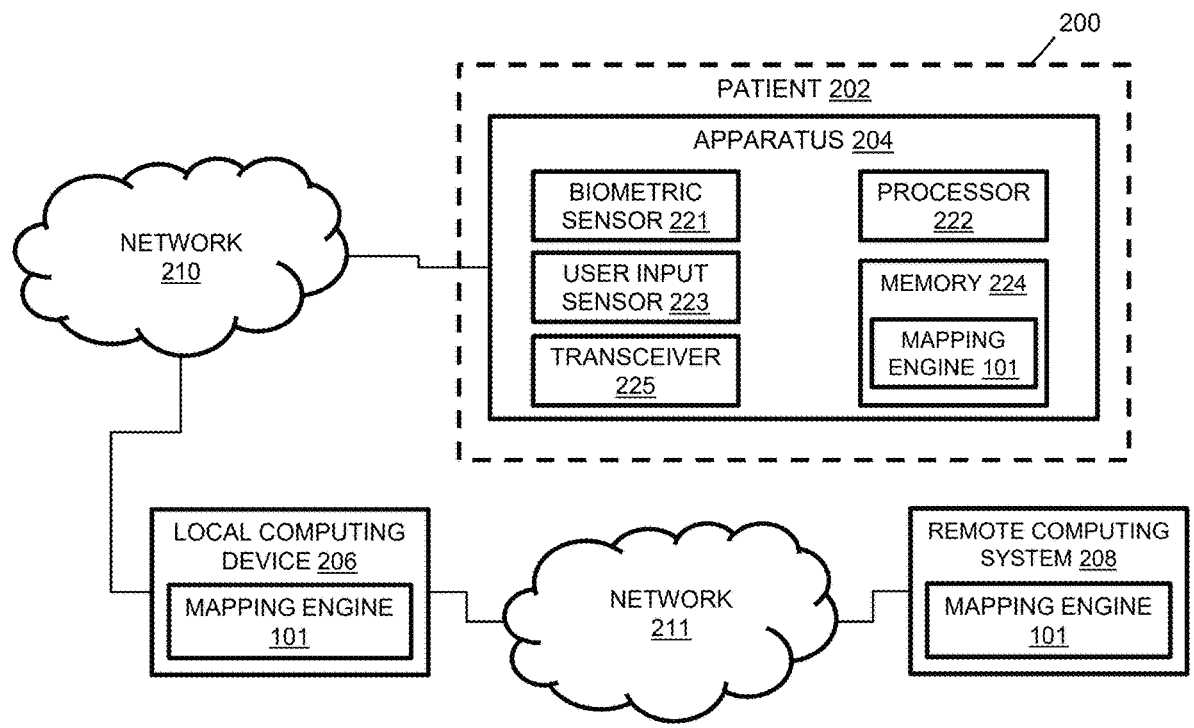
FIG. 2 illustrates a diagram of a system according to one or more embodiments.

Turning now to FIG. 2, a diagram of a system 200 in which one or more features of the disclosure subject matter can be implemented is illustrated according to one or more exemplary embodiments. The system 200 includes, in relation to a patient 202 (e.g., an example of the patient 23 of FIG. 1), an apparatus 204, a local computing device 206, a remote computing system 208, a first network 210, and a second network 211. Further, the apparatus 204 includes a biometric sensor 221 (e.g., an example of the catheter 14 of FIG. 1), a processor 222, a user input (UI) sensor 223, a memory 224, and a transceiver 225. Note that the mapping engine 101 of FIG. 1 is reused in FIG. 2 for ease of explanation and brevity.

According to an embodiment, the apparatus 204 is an example of the system 100 of FIG. 1, where the apparatus 204 can include both components that are internal to the patient 202 and components that are external to the patient 202. According to another embodiment, the apparatus 204 is an apparatus that is external to the patient 202 that includes an attachable patch (e.g., that attaches to a patient's skin). According to another embodiment, the apparatus 204 can be internal to a body of the patient 202 (e.g., subcutaneously implantable), where the apparatus 204 can be inserted into the patient 202 via any applicable manner including orally injecting, surgical insertion via a vein or artery, an endoscopic procedure, or a laparoscopic procedure. According to an embodiment, while a single apparatus 204 is shown in FIG. 2, example systems may include a plurality of apparatuses.

Accordingly, the apparatus 204, the local computing device 206, and/or the remote computing system 208 can be programed to execute computer instructions with respect the mapping engine 101. As an example, the memory 223 stores these instructions for execution by the processor 222 so that the apparatus 204 can receive and process the biometric data via the biometric sensor 201. In this way, the processor 222 and the memory 223 are representative of processors and memories of the local computing device 206 and/or the remote computing system 208.

The apparatus 204, local computing device 206, and/or the remote computing system 208 can be any combination of software and/or hardware that individually or collectively store, execute, and implement the mapping engine 101 and functions thereof. Further, the apparatus 204, local computing device 206, and/or the remote computing system 208 can be an electronic, computer framework comprising and/or employing any number and combination of computing devices and networks utilizing various communication technologies, as described herein. The apparatus 204, local computing device 206, and/or the remote computing system 208 is easily scalable, extensible, and modular, with the ability to change to different services or reconfigure some features independently of others.

The networks 210 and 211 can be a wired network, a wireless network, or include one or more wired and wireless networks. According to an embodiment, the network 210 is an example of a short-range network (e.g., local area network (LAN), or personal area network (PAN)). Information can be sent, via the network 210, between the apparatus 204 and the local computing device 206 using any one of various short-range wireless communication protocols, such as Bluetooth, Wi-Fi, Zigbee, Z-Wave, near field communications (NFC), ultra-band, Zigbee, or infrared (IR). Further, the network 211 is an example of one or more of an Intranet, a local area network (LAN), a wide area network (WAN), a metropolitan area network (MAN), a direct connection or series of connections, a cellular telephone network, or any other network or medium capable of facilitating communication between the local computing device 206 and the remote computing system 208. Information can be sent, via the network 211, using any one of various long-range wireless communication protocols (e.g., TCP/IP, HTTP, 3G, 4G/LTE, or 5G/New Radio). Note that for either network 210 and 211 wired connections can be implemented using Ethernet, Universal Serial Bus (USB), RJ-11 or any other wired connection and wireless connections can be implemented using Wi-Fi, WiMAX, and Bluetooth, infrared, cellular networks, satellite or any other wireless connection methodology.

In operation, the apparatus 204 can continually or periodically obtain, monitor, store, process, and communicate via network 210 the biometric data associated with the patient 202. Further, the apparatus 204, local computing device 206, and/the remote computing system 208 are in communication through the networks 210 and 211 (e.g., the local computing device 206 can be configured as a gateway between the apparatus 204 and the remote computing system 208). For instance, the apparatus 204 can be an example of the system 100 of FIG. 1 configured to communicate with the local computing device 206 via the network 210. The local computing device 206 can be, for example, a stationary/standalone device, a base station, a desktop/laptop computer, a smart phone, a smartwatch, a tablet, or other device configured to communicate with other devices via networks 211 and 210. The remote computing system 208, implemented as a physical server on or connected to the network 211 or as a virtual server in a public cloud computing provider (e.g., Amazon Web Services (AWS®) of the network 211, can be configured to communicate with the local computing device 206 via the network 211. Thus, the biometric data associated with the patient 202 can be communicated throughout the system 200.

Elements of the apparatus 204 are now described. The biometric sensor 221 may include, for example, one or more transducers configured to convert one or more environmental conditions into an electrical signal, such that different types of biometric data are observed/obtained/acquired. For example, the biometric sensor 221 includes one or more of an electrode (e.g., the electrodes 18 and 26 of FIG. 1), a temperature sensor (e.g., thermocouple), a blood pressure sensor, a blood glucose sensor, a blood oxygen sensor, a pH sensor, an accelerometer, and a microphone.

The processor 222, in executing the mapping engine 101, can be configured to receive, process, and manage the biometric data acquired by the biometric sensor 221, and communicate the biometric data to the memory 224 for storage and/or across the network 210 via the transceiver 225. Biometric data from one or more other apparatuses 204 can also be received by the processor 222 through the transceiver 225. Also, as described in more detail herein, the processor 222 may be configured to respond selectively to different tapping patterns (e.g., a single tap or a double tap) received from the UI sensor 223, such that different tasks of a patch (e.g., acquisition, storing, or transmission of data) can be activated based on the detected pattern. In some embodiments, the processor 222 can generate audible feedback with respect to detecting a gesture.

The UI sensor 223 includes, for example, a piezoelectric sensor or a capacitive sensor configured to receive a user input, such as a tapping or touching. For example, the UI sensor 223 can be controlled to implement a capacitive coupling, in response to tapping or touching a surface of the apparatus 204 by the patient 202. Gesture recognition may be implemented via any one of various capacitive types, such as resistive capacitive, surface capacitive, projected capacitive, surface acoustic wave, piezoelectric and infrared touching. Capacitive sensors may be disposed at a small area or over a length of the surface, such that the tapping or touching of the surface activates the monitoring device.

The memory 224 is any non-transitory tangible media, such as magnetic, optical, or electronic memory (e.g., any suitable volatile and/or non-volatile memory, such as random-access memory or a hard disk drive). The memory 224 stores the computer instructions for execution by the processor 222.

The transceiver 225 may include a separate transmitter and a separate receiver. Alternatively, the transceiver 225 may include a transmitter and receiver integrated into a single device.

In operation, the apparatus 204, utilizing the mapping engine 101, observes/obtains the biometric data of the patient 202 via the biometric sensor 221, stores the biometric data in the memory, and shares this biometric data across the system 200 via the transceiver 225. The mapping engine 101 can then utilize models, neural networks, machine learning, and/or artificial intelligence to provide intracardiac unipolar far field reduction or cancelation using multiple electrode catheters.

Figures 3A, 3B:
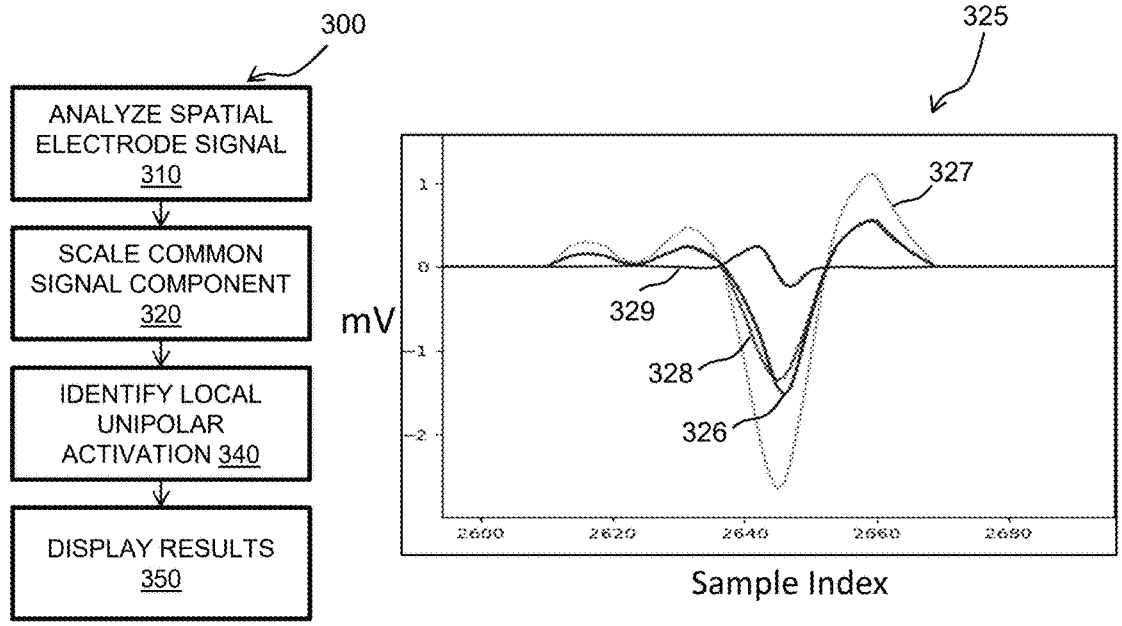
FIG. 3A illustrates a method according to one or more embodiments.
FIG. 3B illustrates a graph according to one or more embodiments.

Turning now to FIG. 3A, a method 300 (e.g., performed by the mapping engine 101 of FIG. 1 and/or of FIG. 2) is illustrated according to one or more exemplary embodiments. The method 300 is an example of providing intracardiac unipolar far field reduction or cancelation using multiple electrode catheters (e.g., the catheter 14). The method 300, in an example, performs atrial local activation detection, as well as ventricle detection within a QRS (regardless of late local activation and annotation). Note that using the multiple electrode catheter provides a spatial advantage, where the mapping engine 101 analyzes each electrode 18 and 26 and each corresponding intracardiac voltage signal based on surrounding spatial electrode information. In this regard, the mapping engine 101 reduces or eliminates far field information from all electrodes, while significantly emphasizing pure local unipolar signals. In addition to accurate activation annotations, the mapping engine 101 also provides scar detection based on local activation amplitude, because the mapping engine 101 outperforms known bipolar sensitivity to spatial electrode direction and distance disadvantages.

The method 300 begins at block 310, where the mapping engine 101 performs a spatial electrode signal analysis for each of a plurality of electrodes. The spatial electrode signal analysis accounts for far field characteristics that are spatial location dependent to provide electrode weighted information and to determine a common signal component, which may be an estimation of far field information.

At least one specific electrode is selected for the spatial electrode signal analysis. For each specific electrode, all other electrode information is considered and correlated with respect to that specific electrode. According to one or more embodiments, the spatial electrode signal analysis is repeated with each electrode being the specific electrode. According to one or more embodiments, for each multielectrode catheter stable site sampling time window, all electrodes are analyzed one by one. Further, for each specific electrode, all other electrodes information is considered as further described herein.

According to one or more embodiments of spatial electrode signal analysis, the electrodes surrounding the specific electrode are weighted in opposite proportion to a distance from that specific electrode. For example, the catheter 14 includes three (3) electrodes in a row separated by a distance, such as two (2) millimeters. The mapping engine 101 analyzes a first electrode and can assign a weight function thereto. An example weight function includes 1-0.25*D, where D is the distance of another electrode from the first electrode. In turn, the mapping engine 101 generates a weighting vector of [w11,w21,w31]=[1, 0.5, 0] and analyzes the first electrode based on multiplying the first electrode by w11=1, a second electrode by w21=0.5, and a third electrode by w31=0.

As a distance from the reference electrode for a particular electrode increases, a weight decreases (e.g., the farther away, a smaller a weighting). According to one or more embodiments, electrodes beyond a certain distance can be excluded (note that the distance is catheter dependent, and in some cases is 5 millimeters). The mapping engine 101 then analyzes the electrode weighted information using one or more algorithms (e.g., mathematical multi-signals decomposition operations). Examples of the one or more algorithms include, but are not limited to singular value decomposition (SVD), principal component analysis (PCA), and/or other matrix decompositions or factorizations. SCV can be a factorization of a real or complex matrix (e.g., an electrode weight matrix W) to generalize the eigendecomposition of a square normal matrix with an orthonormal eigenbasis. By analyzing the electrode weighted information, the mapping engine 101 estimates a common signal component hidden within all signals. The common signal component is estimated by the mapping engine 101 by taking a largest decomposed component/signal. Other examples of the common signal component include a largest common signal component and an estimation of far field information.

At block 320, the mapping engine 101 scales the common signal component (identified by the mapping engine 101 and/or the spatial electrode signal analysis). According to one or more embodiment, the mapping engine 101 scales the common signal component automatically by applying an inverse decomposition formula, using only the common signal component. Then, the far field signal is estimated by taking the scaled common signal.

According to one or more embodiment, the mapping engine 101 scales the common signal component to best fit an analyzed electrode signal. For example, as shown in graph 325 of FIG. 3B, a scaling is demonstrated by scalar multiplication. The graph 325 includes a sample index x-axis and a milli-voltage y-axis. The graph shows an original signal 326, a common signal 327, a scaled common signal 328 (i.e., far field), and a residual local signal 329 (i.e., near field). Further, a residual signal is determined. That is, once scaled and fitted, the common signal component is subtracted to leave only the residual signal. The residual signal estimates pure local information. Local information can include, but is not limited to, local field signals within the electrical activity detected by an electrode.

At block 340, the mapping engine 101 analyzes the pure local information to identify/generate/provide local unipolar activations. The local unipolar activations can include complex cases of dabble activation patterns. According to one or more embodiments, for LAT mapping, the mapping engine 101 utilizes a minimum pure local information derivative to detect an activation instant within a cardiac cycle. According to one or more embodiments, for voltage (V) mapping, the mapping engine 101 takes a local activation peak to peak within a cardiac cycle. For both maps, the mapping engine 101 averages final local results on several cardiac cycles and adds a spatial smoothing by combining all different spatial local results.

At block 350, the mapping engine 101 displays results. According to one or more embodiments, the mapping engine provides the local unipolar activations (e.g., all local activation patterns, for each electrode) on top of a constant zero background of a user interface of the display 165. The visual presentation by the display 165 of the local activation patterns can include large time durations for consistency analysis.

Figure 4:
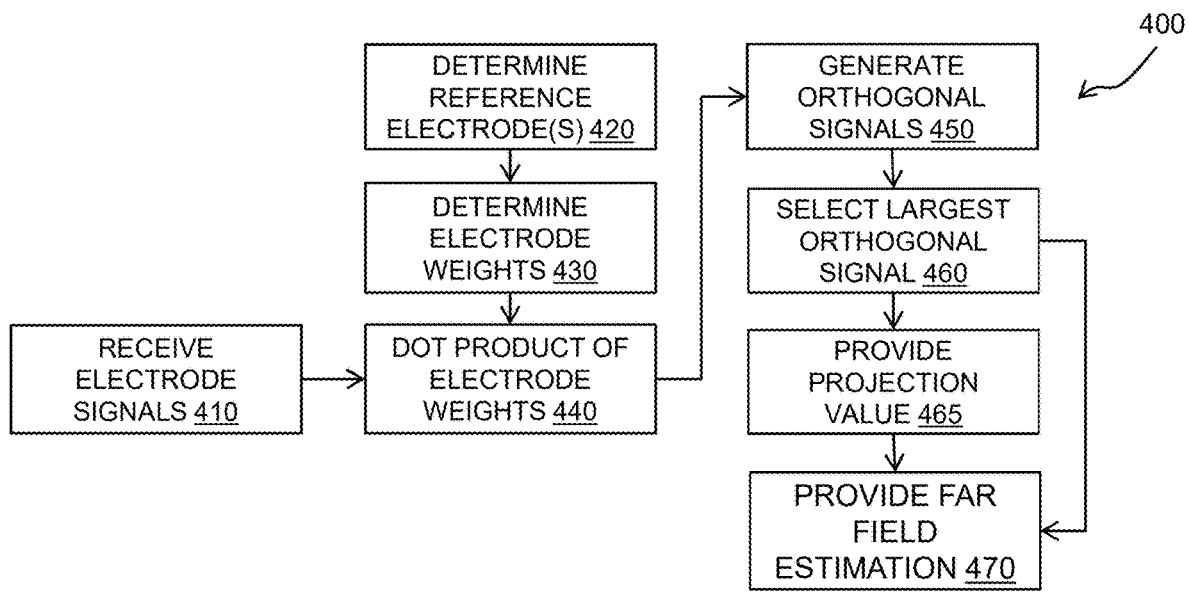
FIG. 4 illustrates a method according to one or more embodiments.

Turning now to FIG. 4, a method 400 (e.g., performed by the mapping engine 101 of FIG. 1 and/or of FIG. 2) is illustrated according to one or more exemplary embodiments. The method 400 is an example of an estimation of far field information, such as described with respect to block 310 of FIG. 3A.

The method 400 begins at block 410, where the mapping engine 101 receives electrode signals s from a plurality of electrodes 18 and 26. According to one or more embodiments, the mapping engine 101 receives electrode signals s from the electrodes 26 of the catheter 14.

At block 420, the mapping engine 101 determines a reference electrode q of the plurality of electrodes 18 and 26. The reference electrode q can be selected from any of the electrodes 26 of the catheter 14. Further, more than one reference electrode q can be determined, such that the method 400 executes for each reference electrode q.

Figure 5:
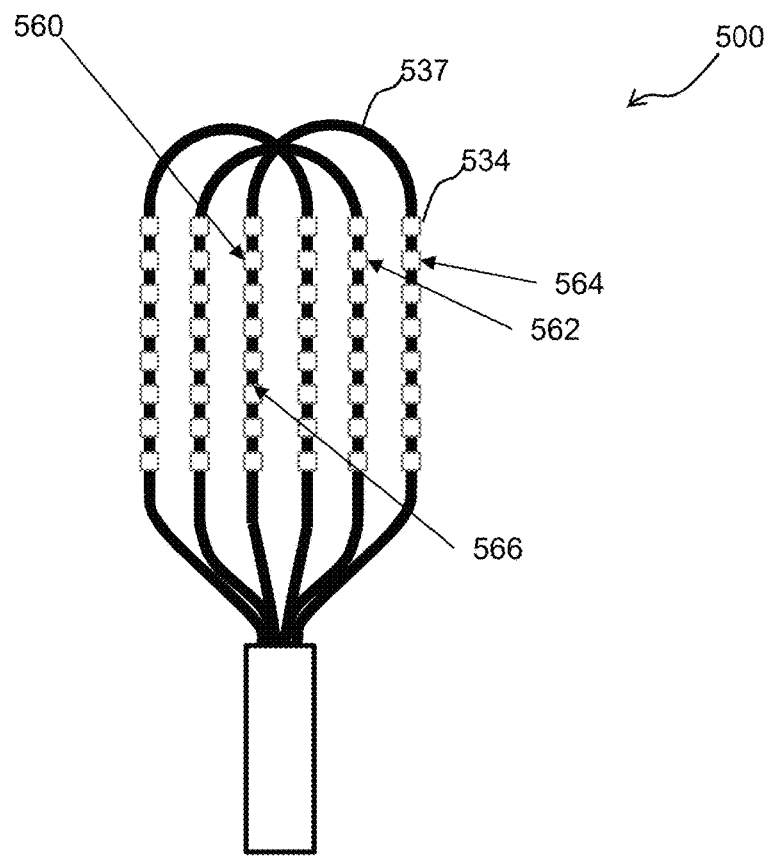
FIG. 5 depicts an exemplary catheter according to one or more embodiments.
Figure 6:
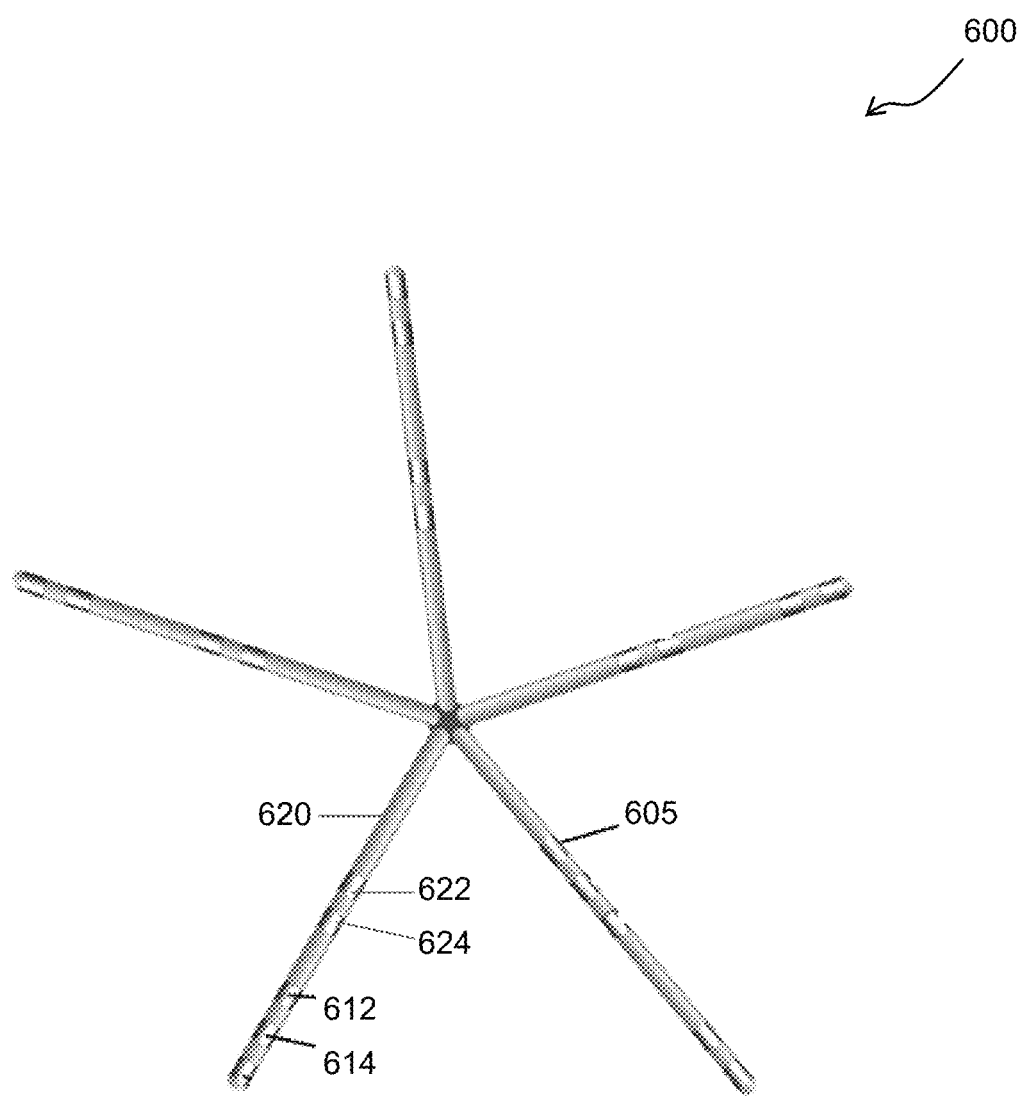
FIG. 6 depicts an exemplary catheter according to one or more embodiments.

At block 430, the mapping engine 101 determines weights according to an electrode weight matrix W based on the reference electrode q. The electrode weight matrix W can be based on a structure of the catheter 14. Note that the electrode weight matrix W stores and manages weights for electrodes surrounding a specific electrode in opposite proportion to a distance from that specific electrode. High-density mapping catheter examples can include, but are not limited to, an OCTARAY™ Mapping Catheter and/or PENTARAY® NAV ECO High Density Mapping Catheter by Biosense Webster®. FIGS. 5-6 illustrate example catheters 14.

FIG. 5 illustrates a catheter 500 according to one or more embodiments. The catheter 500 can be a catheter having a plurality of electrodes 534, such as at least twenty (20) electrodes. As shown, the plurality of electrodes can include exactly forty eight (48) electrodes located across or dispersed on multiple spines 37. Using such a number of electrodes 534 spread across a wide area by the spines 537 allows the capturing of large amount of electrical activity over a large area at once. According to one or more embodiments, the multiple spines 537 move through a sheath in a collapsed state and may be expanded once within the patient 23 of FIG. 1. Electrical activity at any focal point in the heart 12 may be typically measured by advancing the catheter 500, contacting the heart tissue with the catheter 500, and acquiring data related to electrical activity at that point. One or more of the electrodes 534 can be selected as a reference electrode q.

For example, an electrode 560 is designated as the reference electrode q. Further, as the distance from the electrode 560 increases, a weight decreases. In this way, because an electrode 562 is closer to the electrode 560 than an electrode 564, the electrode 562 will have a higher weight than the electrode 564. Further because an electrode 566 is further from the electrode 560 than the electrode 562, the electrode 566 will have a lower weight than the electrode 562. Note that distance between each of the electrodes 534 can be measured with respect to a three dimensional space (i.e., using x, y, z, coordinates). In turn, the electrodes 564 and 566 may or may not have the same weight.

FIG. 6 illustrates a catheter 600 according to one or more embodiments. The catheter 600 is a catheter having a plurality of electrodes 605 that provide one or more physiological signals. For instance, the electrodes 605 can number at least three (3) arranged in any combination of groups. As shown in FIG. 6, a group of three electrodes 612, 614, and unnumbered are on a same spline 620 as a group of two electrodes 622 and 624. According to one or more embodiments, the catheter 600 includes at least five (5) arms (as shown in FIG. 6), and in some cases eight (8) or more, and the electrodes 205 can include twenty (20) or forty-eight (48) unipolar electrodes positioned in pairs or couples 1 millimeter or 2 millimeter apart from one another (e.g., higher density improves performance).

Returning to the method 400, at block 440, the mapping engine 101 determines a dot product of the weights according to the electrode weight matrix W and the electrode signals s.

At block 450, the mapping engine 101 processes the dot product using one or more algorithms to generate orthogonal signals. Generally, the one or more algorithms of the mapping engine 100 include a mathematical multi-signals decomposition operation. Examples of the one or more algorithms include, but are not limited to, singular value decomposition (SVD), principal component analysis (PCA), and/or other matrix decompositions or factorizations. SCV can be a factorization of a real or complex matrix (e.g., the electrode weight matrix W) to generalize the eigendecomposition of a square normal matrix with an orthonormal eigenbasis.

At block 460, the mapping engine 101 selects a largest signal of the orthogonal signals. At block 455, the mapping engine 101 performs a correlation of the largest signal to signals of the reference electrode q to provide a projection value. At block 470, the mapping engine 101 takes a tensor product of the largest signal and the projection value to provide a far field estimation (e.g., the common signal component of the electrical activity estimated by the spatial electrode signal analysis).

Figure 7:
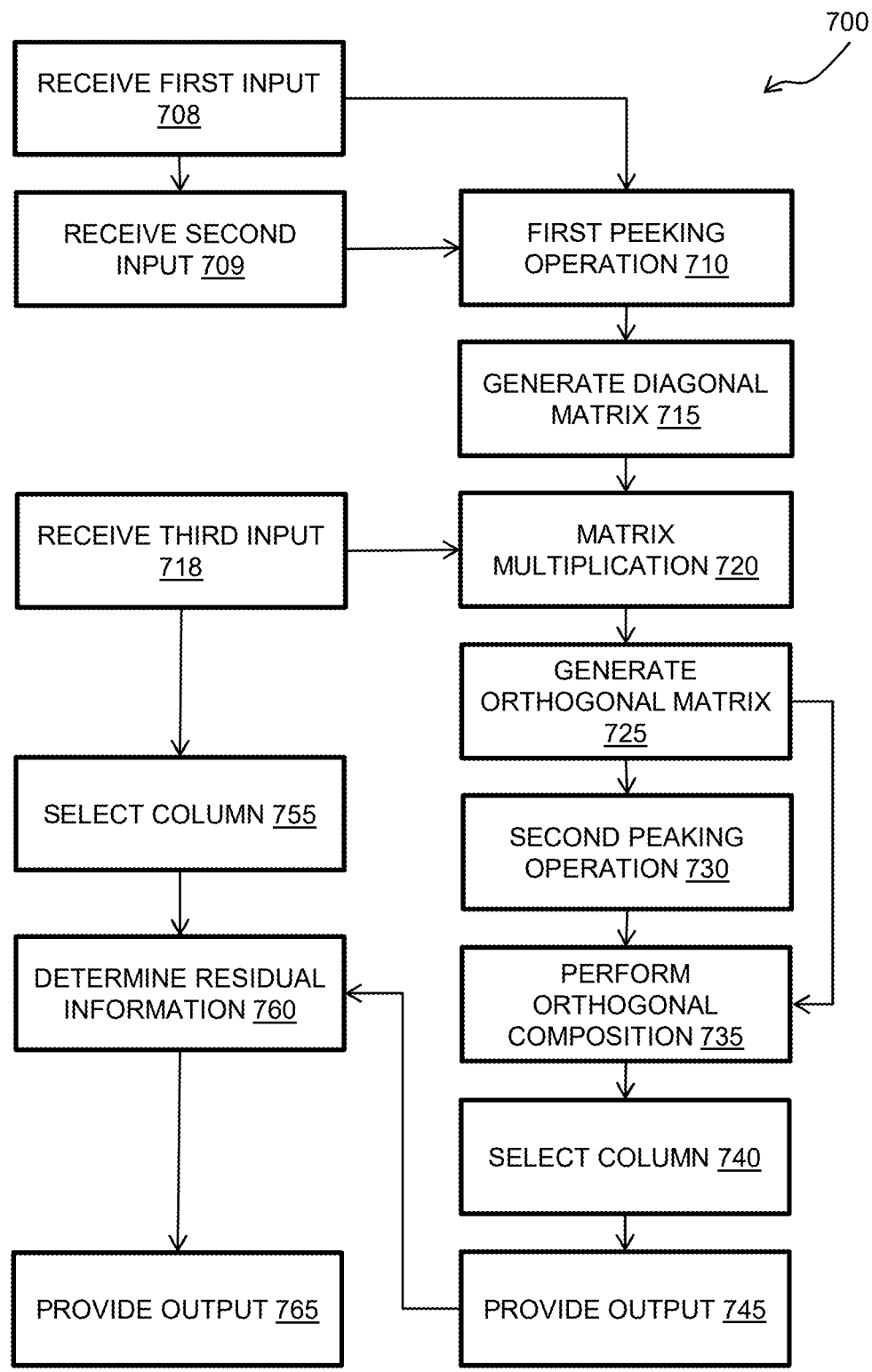
FIG. 7 depicts a method according to one or more embodiments.

Turning now to FIG. 7, a method 700 (e.g., performed by the mapping engine 101 of FIG. 1 and/or of FIG. 2) is illustrated according to one or more exemplary embodiments. The method 700 is an example of a cardiac cycle specific electrode signal analysis, such as described with respect to block 310 of FIG. 3A.

At block 708, the mapping engine 101 receives a first input. The first input includes a global P×P weights matrix. At block 709, receives a second input. The second input includes a specific electrode Index K.

At block 710, the mapping engine 101 executes a first peeking operation. The first peeking operation includes peeking at a matrix row vector K. At block 715, the mapping engine 101 converts the global P×P weights matrix into a diagonal matrix. According to one or more embodiments, the mapping engine 101 outputs for the electrode K a specific P×P weights matrix with Wkk=1.

At block 718, the mapping engine 101 receives a third input. The third input includes N time samples with P electrode information in an N×P matrix. At block 720, the mapping engine 101 performs a matrix multiplication. The matrix multiplication includes a multiplication between the N×P matrix and the diagonal matrix to output a weighted information N×P matrix. At block 725, the mapping engine 101 performs an orthogonal decomposition of the weighted information N×P matrix to generate of the orthogonal components N×P matrix.

At block 730, the mapping engine 101 executes a second peeking operation. The second peeking operation looks at the orthogonal components N×P matrix to find a largest component. The largest component is the common component.

At block 735, the mapping engine 101 performs an orthogonal composition of the common component. The mapping engine 101 can utilize the orthogonal components N×P matrix from the orthogonal decomposition of block 725. The mapping engine 101 provides a common component based on the composed N×P matrix. At block 740, the mapping engine 101 selects a column K. At block 745, the mapping engine 101 provides an output. The output includes estimated far field signal for the electrode K.

At block 755, the mapping engine 101 also selects a column K to determine electrode K original information. At block 760, the mapping engine 101 performs a far field subtraction on the original information using the output in block 745 to determine residual information. At block 765, the mapping engine 101 provides an output. The output includes estimated local information per electrode.

According to one or more embodiments or any of the method embodiments herein, a method is provided. The method includes receiving, by a mapping engine executed by one or more processors, electrical activity from a plurality of electrodes of a catheter. The method includes performing, by the mapping engine, a spatial electrode signal analysis of the electrical activity for each electrode of the plurality of electrodes. The method includes scaling, by the mapping engine, a common signal component of the electrical activity identified by the spatial electrode signal analysis to determine a residual signal.

According to one or more embodiments or any of the method embodiments herein, the spatial electrode signal accounts for far field characteristics that are spatial location dependent to provide electrode weighted information.

According to any of the method embodiments herein, the residual signal estimates pure local information.

According to any of the method embodiments herein, the catheter comprises a high-density mapping catheter.

According to any of the method embodiments herein, the mapping engine analyzes the residual signal to identify local unipolar activations.

According to any of the method embodiments herein, the mapping engine displays results comprising the local unipolar activations.

According to any of the method embodiments herein, the mapping engine determines a reference electrode of the plurality of electrodes.

According to any of the method embodiments herein, the mapping engine determines weights for each of the plurality of electrodes according to an electrode weight matrix based on the reference electrode.

According to any of the method embodiments herein, the mapping engine determines a dot product of the weights and the electrical activity.

According to any of the method embodiments herein, the mapping engine processes the dot product using one or more algorithms to generate orthogonal signals.

According to any of the method embodiments herein, the one or more algorithms comprises singular value decomposition.

According to any of the method embodiments herein, the mapping engine selects a largest signal of the orthogonal signals.

According to any of the method embodiments herein, the mapping engine performs a correlation of the largest signal to signals of the reference electrode to provide a projection value.

According to any of the method embodiments herein, the mapping engine determines a tensor product of the largest signal and the projection value to provide a far field estimation as the common signal component.

According to one or more embodiments, a system is provided. The system includes a memory storing software of a mapping engine. The system includes one or more processors. The one or more processors execute the software to cause the mapping engine to receive electrical activity from a plurality of electrodes of a catheter; perform a spatial electrode signal analysis of the electrical activity for each electrode of the plurality of electrodes; and scale a common signal component of the electrical activity identified by the spatial electrode signal analysis to determine a residual signal.

According to any of the system embodiments herein, the residual signal estimates pure local information and the catheter comprises a high-density mapping catheter.

According to any of the system embodiments herein, the mapping engine determines a reference electrode of the plurality of electrodes and determines weights for each of the plurality of electrodes according to an electrode weight matrix.

According to any of the system embodiments herein, the ma spatial electrode signal analysis accounts for far field characteristics that are spatial location dependent to provide electrode weighted information.

According to any of the system embodiments herein, the mapping engine analyzes the residual signal to identify local unipolar activations According to any of the system embodiments herein, the mapping engine displays results comprising the local unipolar activations.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving intracardiac electroanatomical mapping by reducing far field interference and isolating local unipolar electrical activity during a cardiac electrophysiology procedure, the method comprising:
    receiving electrical activity from a plurality of electrodes of a catheter;
    performing a spatial electrode signal analysis of the electrical activity for each electrode of the plurality of electrodes, wherein the spatial electrode signal analysis comprises weighting electrical activity signals based on distances between electrodes to form weighted signals, and decomposing the weighted signals using a matrix decomposition algorithm to identify a common signal component representing far field activity;
    scaling the common signal component to form a scaled common signal component; and
    determining a residual signal by subtracting the scaled common signal component from the electrical activity, wherein the residual signal represents near field local unipolar electrical activity used to identify activation timing during the cardiac electrophysiology procedure.

2. The method of claim 1, wherein the catheter comprises a high-density mapping catheter.

3. The method of claim 1 further comprising:
    displaying the near field local unipolar electrical activity.

4. The method of claim 1, further comprising:
    determining a reference electrode of the plurality of electrodes.

5. The method of claim 1, wherein the spatial electrode signal analysis further includes
    determining a dot product of the weights and the electrical activity.

6. The method of claim 5, wherein the dot product is calculated using one or more algorithms to generate orthogonal signals.

7. The method of claim 6, wherein the one or more algorithms comprise singular value decomposition.

8. The method of claim 1, wherein the spatial electrode signal analysis further includes:
    performing a correlation of a largest signal among the electrical activity to signals of a reference electrode among the plurality of electrodes to provide a projection value.

9. The method of claim 1, wherein the spatial electrode signal analysis further includes:
    determining a tensor product of a largest signal among the electrical activity and a projection value to provide a far field estimation.

10. The method of claim 1, wherein the matrix decomposition algorithm comprises singular value decomposition or principal component analysis.

11. The method of claim 1, wherein the common signal component is subtracted from electrical activity of each electrode of the plurality of electrodes to determine a respective residual signal for the each electrode.

12. The method of claim 1, wherein the catheter comprises a plurality of splines, each spline including a subset of the plurality of electrodes.

13. The method of claim 1, wherein the residual signal is used to identify scar tissue based on amplitude characteristics.

14. A system for improving intracardiac electroanatomical mapping by reducing far field interference and isolating local unipolar electrical activity during a cardiac electrophysiology procedure, the system comprising:
    a memory; and
    one or more processors communicatively coupled to the memory, wherein the one or more processors are collectively configured to:
    receive electrical activity from a plurality of electrodes of a catheter;
    perform a spatial electrode signal analysis of the electrical activity for each electrode of the plurality of electrodes, wherein the spatial electrode signal analysis comprises weighting electrical activity signals based on distances between electrodes to form weighted signals, and decomposing the weighted signals using a matrix decomposition algorithm to identify a common signal component representing far field activity;
    scale the common signal component to form a scaled common signal component; and
    determine a residual signal by subtracting the scaled common signal component from the electrical activity, wherein the residual signal represents near field local unipolar electrical activity used to identify activation timing during the cardiac electrophysiology procedure.

15. The system of claim 14, wherein the catheter comprises a high-density mapping catheter.

16. The system of claim 15, wherein the one or more processors are further collectively configured to:
    display the near field local unipolar electrical activity.

17. The system of claim 14, wherein the one or more processors are further collectively configured to determine a signal-to-noise ratio of the residual signal.

18. The system of claim 14, wherein the one or more processors are further collectively configured to determine the activation timing based on a minimum derivative of the residual signal.

19. A non-transitory computer readable storage medium storing instructions for improving intracardiac electroanatomical mapping by reducing far field interference and isolating local unipolar electrical activity during a cardiac electrophysiology procedure, the instructions when executed by a processor of a surgical console cause the surgical console to perform operations including:

receiving electrical activity from a plurality of electrodes of a catheter;

performing a spatial electrode signal analysis of the electrical activity for each electrode of the plurality of electrodes, wherein the spatial electrode signal analysis comprises weighting electrical activity signals based on distances between electrodes to form weighted signals, and decomposing the weighted signals using a matrix decomposition algorithm to identify a common signal component representing far field activity;

scaling the common signal component to form a scaled common signal component; and determining a residual signal by subtracting the scaled common signal component from the electrical activity, wherein the residual signal represents near field local unipolar electrical activity used to identify activation timing during the cardiac electrophysiology procedure.

20. The non-transitory computer readable storage medium of claim 19, wherein the instructions further cause the surgical console to highlight regions of interest on a cardiac map based on the near field local unipolar electrical activity.

* * * * *